United States Patent
Campbell

(10) Patent No.: US 8,214,279 B2
(45) Date of Patent: *Jul. 3, 2012

(54) METHOD OF COMPUTERIZED MONITORING OF INVESTMENT TRADING AND ASSOCIATED SYSTEM

(75) Inventor: David H. Campbell, Pittsburgh, PA (US)

(73) Assignee: Access Data Corporation, Pittsburgh, PA (US)

( * ) Notice: Subject to any disclaimer, the term of this patent is extended or adjusted under 35 U.S.C. 154(b) by 969 days.

This patent is subject to a terminal disclaimer.

(21) Appl. No.: 10/860,714

(22) Filed: Jun. 3, 2004

(65) Prior Publication Data

US 2005/0240509 A1    Oct. 27, 2005

Related U.S. Application Data

(60) Provisional application No. 60/564,848, filed on Apr. 23, 2004.

(51) Int. Cl.
*G06Q 40/00* (2012.01)
*G06Q 10/00* (2012.01)

(52) U.S. Cl. .................. 705/37; 705/7.11; 705/7.38

(58) Field of Classification Search ............ 705/37
See application file for complete search history.

(56) References Cited

U.S. PATENT DOCUMENTS

| | | | |
|---|---|---|---|
| 5,214,579 A * | 5/1993 | Wolfberg et al. | 705/36 R |
| 5,583,760 A | 12/1996 | Klesse | |
| 5,749,077 A | 5/1998 | Campbell | |
| 5,864,685 A | 1/1999 | Hagan | |
| 5,893,079 A | 4/1999 | Cwenar | |
| 6,055,525 A | 4/2000 | Nusbickel | |
| 6,185,567 B1 | 2/2001 | Ratnaraj et al. | |
| 6,470,325 B1 | 10/2002 | Leemhuis | |
| 6,604,104 B1 | 8/2003 | Smith | |
| 6,947,904 B1 | 9/2005 | Macey | |
| 7,149,713 B2 * | 12/2006 | Bove et al. | 705/36 R |
| 7,165,044 B1 * | 1/2007 | Chaffee | 705/37 |
| 7,184,984 B2 | 2/2007 | Glodjo et al. | |
| 7,197,484 B1 * | 3/2007 | Yuyama | 705/50 |
| 7,321,871 B2 * | 1/2008 | Scott et al. | 705/36 R |
| 7,657,474 B1 * | 2/2010 | Dybala et al. | 705/35 |
| 2001/0014873 A1 | 8/2001 | Henderson et al. | |
| 2002/0002512 A1 | 1/2002 | Harpale | |
| 2002/0032636 A1 | 3/2002 | Shields et al. | |
| 2002/0069155 A1 * | 6/2002 | Nafeh et al. | 705/37 |
| 2002/0112055 A1 | 8/2002 | Capers et al. | |
| 2002/0133458 A1 | 9/2002 | Zhou et al. | |
| 2002/0138386 A1 * | 9/2002 | Maggioncalda et al. | 705/36 |

(Continued)

OTHER PUBLICATIONS

Gary D. Halbert, "Mutual Funds—The Blame Game", Oct. 28, 2003, Forecast & Trends.*

(Continued)

*Primary Examiner* — Charles Kyle
*Assistant Examiner* — Irene Kang
(74) *Attorney, Agent, or Firm* — Greenberg Traurig, LLP

(57) ABSTRACT

A method of computerized monitoring of investment trading includes providing historic trading data for a specific trader, selecting a plurality of trading parameters for the specific trader and obtaining current information regarding the selected parameters, and/or providing historic trading data and applying rules to the current information and/or historic trading data to determine if a rules violation has occurred. The system may be employed to monitor whether market timing of mutual fund investments has occurred. A corresponding computerized system is disclosed.

32 Claims, 2 Drawing Sheets

U.S. PATENT DOCUMENTS

| | | |
|---|---|---|
| 2002/0143680 A1* | 10/2002 | Walters et al. .................. 705/36 |
| 2003/0040999 A1 | 2/2003 | Hagan |
| 2003/0070003 A1 | 4/2003 | Chong et al. |
| 2003/0093352 A1 | 5/2003 | Muralidhar et al. |
| 2003/0167221 A1* | 9/2003 | Kochansky .................... 705/36 |
| 2003/0208378 A1 | 11/2003 | Thangaraj et al. |
| 2003/0208559 A1 | 11/2003 | Velline et al. |
| 2003/0225663 A1* | 12/2003 | Horan et al. .................... 705/36 |
| 2004/0039646 A1 | 2/2004 | Hacker |
| 2004/0088195 A1 | 5/2004 | Childress et al. |
| 2004/0162772 A1 | 8/2004 | Lewis |
| 2004/0167840 A1 | 8/2004 | Tully et al. |
| 2004/0167849 A1 | 8/2004 | Yass et al. |
| 2004/0210501 A1 | 10/2004 | Laskin et al. |
| 2004/0215549 A1 | 10/2004 | Madhavan et al. |
| 2005/0007249 A1 | 1/2005 | Eryurek et al. |
| 2005/0060205 A1 | 3/2005 | Woods et al. |
| 2005/0102219 A1 | 5/2005 | Taylor et al. |
| 2005/0137969 A1* | 6/2005 | Shah .............................. 705/39 |
| 2005/0182655 A1 | 8/2005 | Merzlak et al. |
| 2006/0064371 A1 | 3/2006 | Petrov |
| 2006/0145892 A1 | 7/2006 | Gueziec |
| 2007/0130043 A1* | 6/2007 | O'Shaughnessy et al. . 705/36 R |
| 2007/0174160 A1 | 7/2007 | Solberg et al. |
| 2007/0179890 A1 | 8/2007 | Sandford et al. |
| 2007/0192336 A1 | 8/2007 | Iyer et al. |
| 2007/0226027 A1 | 9/2007 | Chang et al. |

OTHER PUBLICATIONS

Scurities and Exchange Commission, "Final Rule: Compliance Programs of Investment Companies and Investment Advisers", Dec. 17, 2003, Code of Federal Regulations, 17 CFR Parts 270 and 275, pp. 4, and 31-32.*

"Mantas and IBM Offer Joint Solution to Help Detect and Address Mutual Fund Abuses; Companies to Promote Comprehensive Compliance Solutions for Financial Markets", Feb. 5, 2004, www.businesswire.com.*

"Mantas and IBM Offer Joint Solution to Help Detect and Address Mutual Fund Abuses; Companies to Promote Comprehensive Compliance Solutions for Financial Markets", Feb. 7, 2004, www.buisinesswire.com.*

New software assists in parameter compliance checking for fund management firm's clients, LatentZero.com, Jun. 2, 2003.

* cited by examiner

METHOD OF COMPUTERIZED MONITORING OF INVESTMENT TRADING AND ASSOCIATED SYSTEM

CROSS-REFERENCE TO RELATED APPLICATION

This application claims the benefit of U.S. Provisional Application Ser. No. 60/564,848 entitled "A METHOD OF COMPUTERIZED MONITORING OF INVESTMENT TRADING AND ASSOCIATED SYSTEM" filed Apr. 23, 2004.

BACKGROUND OF THE INVENTION

1. Field of the Invention

The present invention relates to a method and associated system for computerized monitoring of investment trading and more specifically it relates to a system which as to a specific trader and a specific investment obtains current information regarding selected trading parameters and compares it with historic trading data regarding the same and applies rules to determine if a violation of the rules has occurred.

2. Description of the Prior Art

It has long been known to employ computerized systems to process data, store the same and provide for output and various formats as desired. It is also been known to use the same for investment purposes. See, for example, U.S. Pat. Nos. 5,749,077 and 5,893,079.

In recent years, the need for a system to provide more effective and timely monitoring of investment activities has become acute. More specifically, numerous instances of improper conduct have resulted from "market timing" in the trading of mutual funds. For example, individuals have been known to engage in frequent purchases of mutual funds in large quantities at an early phase of an upward movement of the market and selling the same after a brief elapsed period as the market moves upward. The frequency of such transactions has reached the point in many instances of being burdensome on the mutual fund. The mutual fund must at times be forced to sell investment securities at a less than preferred time in order to reimburse such traders for their sizable redemptions. Also, the increased trading volume increases the mutual fund's transaction costs. This results in smaller investors being hurt as the market timing traders deprive the mutual fund of doing the most efficient job of maximizing the return for other investors. In addition, there have been instances of late trading involving transactions which were permitted to occur illegally after the market had closed, thereby permitting the individuals engaging such trading to take advantage of late-breaking news in anticipation of the response by the market upon opening the next day.

There remains, therefore, a real and substantial need for an effective automated system which can monitor on a rapid and reliable basis improper market timing behavior.

SUMMARY OF THE INVENTION

The present invention has met the above described need. It provides a method by which computerized monitoring of investment trading may be accomplished in a rapid, efficient and accurate manner by providing historic trading data for a specific trader, selecting a plurality of trading parameters for the specific trader and obtaining current information regarding those selected parameters followed by reviewing the current information and/or the historic trading data and then determining whether any of the rules employed in the method have been violated based upon the current information and historic trading data. In a preferred embodiment, the rules are applied to the current information and the historic trading data after comparison of the two categories of information. In the event of a violation of the rules, an appropriate alarm report is emitted.

The method and system may advantageously be employed in monitoring a specific trader with respect to a specific investment such as a mutual fund, for example, to determine whether improper market timing has occurred.

Various forms of trading parameters including pattern recognition are provided as a preferred means for monitoring such activity.

The computerized system of the present invention includes the data receiving interface for receiving trading data and organizing it according to the specific trader and specific investment. A server is structured to receive the organized trader- and investment-specific data from the receiving interface as well as providing an historical data unit to deliver data to the server. The server is structured to receive rules which govern permissible conduct and to compare the rules with the current information and historic data in making a determination as to whether a departure from acceptable trading conduct has occurred.

It is an object of the present invention to provide a computerized method and system for efficiently, accurately and promptly monitoring selected trading parameters in order to determine if a violation from the rules has occurred.

It is another object of the present invention to provide such a system which is structured to focus on a specific trader and within that specific trader's activities a specific investment and the trader's conduct with respect to the same over a period of time.

It is another object of the present invention to permit the rules to be revised by the user so as to alter the standards.

These and other objects of the invention will be more fully understood from the following description of the invention with reference to the drawings appended hereto.

DESCRIPTION OF THE PREFERRED EMBODIMENTS

As employed herein, the term "investments" shall expressly include, but not be limited to, mutual funds, common and preferred shares of stock, whether listed on an exchange or not, high-yield corporate bonds and high-grade corporate bonds, municipal bonds, United States bills, notes and bonds, mortgage-related investments and short-term securities such as commercial paper, banker's acceptances, repurchase agreements and supporting currencies.

As employed herein, the term "trading parameters" means one or more units of information relevant to investment trading in one or more investment products and shall expressly include but not be limited to transaction date, transaction time, price, product identity, trader identity, investment identity, trading volume and investment price history.

As employed herein, the term "historic trading data" means as to a specific trader, specific details regarding the trading record of that trader in respect of both sales and purchases including but not limited to the investment, the number and value of the specific investment, as to each trade the investment date and amount, with respect to sales, profit both before and after commissions and with respect to investments held, the return on investment before commissions, after commissions and annualized, patterns of trading, profitable trades, elapsed time between trades, number of market timing trades, trader trading history, dollar volume of market timing trades, percentage of market timing trades to all trades, trading patterns and selected critical days.

As employed herein, reference to "sub account" or "detail account" shall mean trader account information which may include one or more of the following: shareholder registration information, broker information, holding information and asset position information.

As employed herein, "omnibus account" refers to a large group of investors that are reported as a single account and an "omnibus trade" is a trade against an omnibus account.

As employed herein, a "detail trade" is a trade against a detail account.

The present invention provides means for isolating a trader and specific investment. The term "trader" embraces not only an individual trader who is the holder of an account, but also others to be monitored in a similar manner in respect of trading activity such as brokers, account representatives and account managers, for example. It includes generating a database of historical trading data regarding the specific trader as well as obtaining current information on a plurality of trading parameters which can be compared with the historical data. The trading parameters are preferably selected to correspond to the rules employed. Automated application of rules is employed to determine if a violation of the rules, such as market timing activity, has occurred with appropriate communications being emitted when such departure from rules has been determined to exist.

Figure 1:
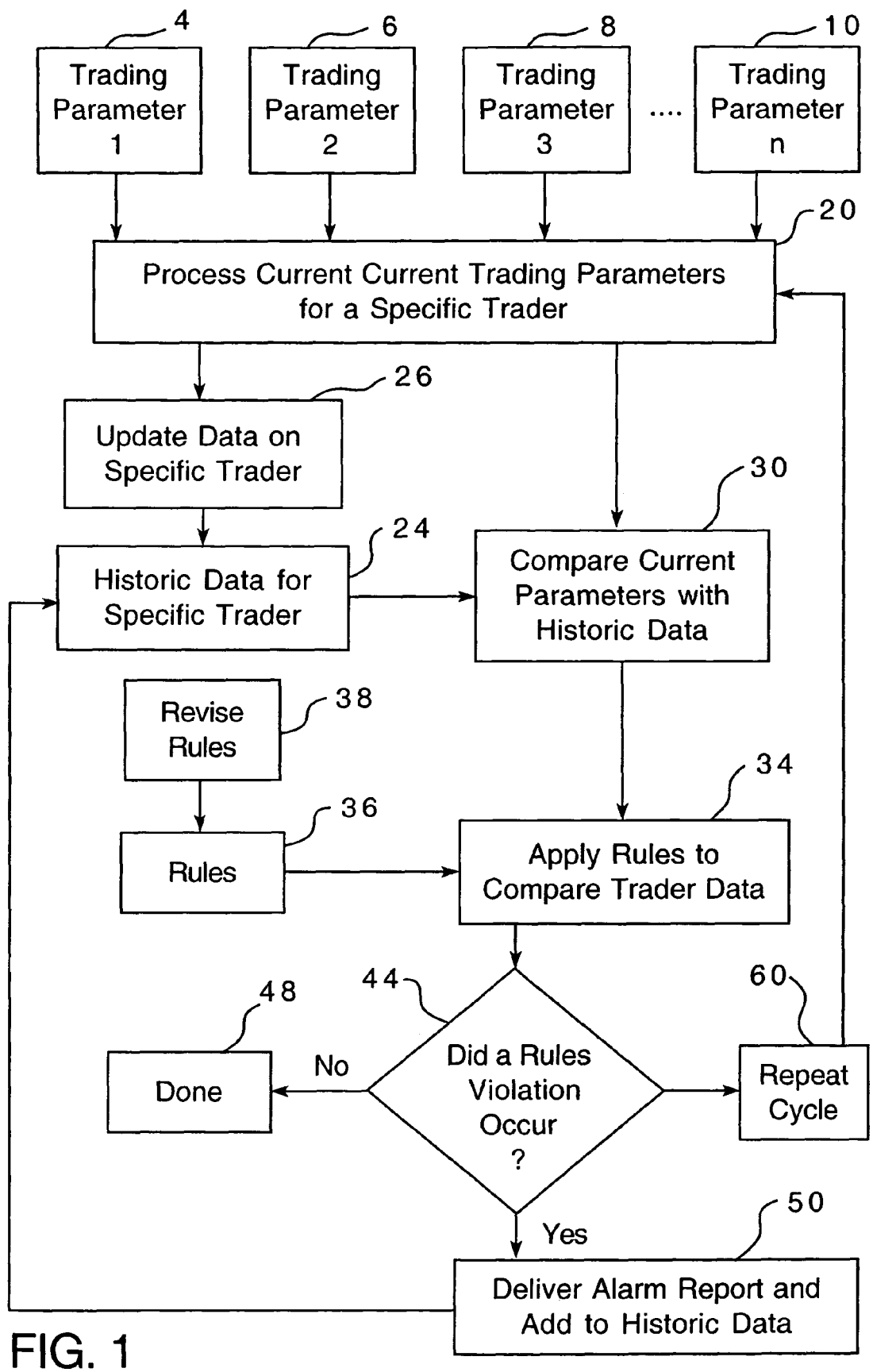
FIG. 1 is a flow diagram showing a form of method of the present invention.

A preferred form of the method of the invention is illustrated in the flow diagram of FIG. 1 wherein a plurality of data packets represented by trading parameters 1-n, trading reference numbers 4,6,8,10 are all processed 20 to provide current trading information regarding a specific trader. This information is not only delivered to the historic data for combination therewith 24 at 26, but also is subjected to a comparison between the current information and the historic trading data 30. This information is then subjected to application of the rules in order to determine if a departure from the rules exists. The rules 36 which govern the method of evaluation or detection may be revised by the user or others permitted to do so 38 and then are provided in their current form for the comparison 34. The next block indicates the issue of whether a rules violation has occurred 44. If the answer is "no", that is the end 48 of that cycle of the process. If the answer is "yes", then an alarm report is delivered 50 and the existence of this departure is delivered to the historic data 29 for the specific trader 24. This cycle is repeated 60 with a predetermined frequency as determined by the user.

While the preferred practice of the invention involves making a comparison of the current information with the historic trading data, in some instances one may avoid the comparison and employ solely the current information or historic trading data in applying the rules.

The rules 36 may be modified and corresponding changes made in the trading parameters 4, 6, 8, 10 to facilitate efficient monitoring.

It will be appreciated that the historic trading data contains information regarding patterns of trading, times of trading, particular critical days and relationship to trading as well as the foregoing summarized information.

Some of the rules may relate to preferred practices of a user such as a mutual fund, brokerage, broker, dealer, government agencies, or others involved in the investment community, while others might relate to determination of improper conduct such as market timing.

Figure 2:
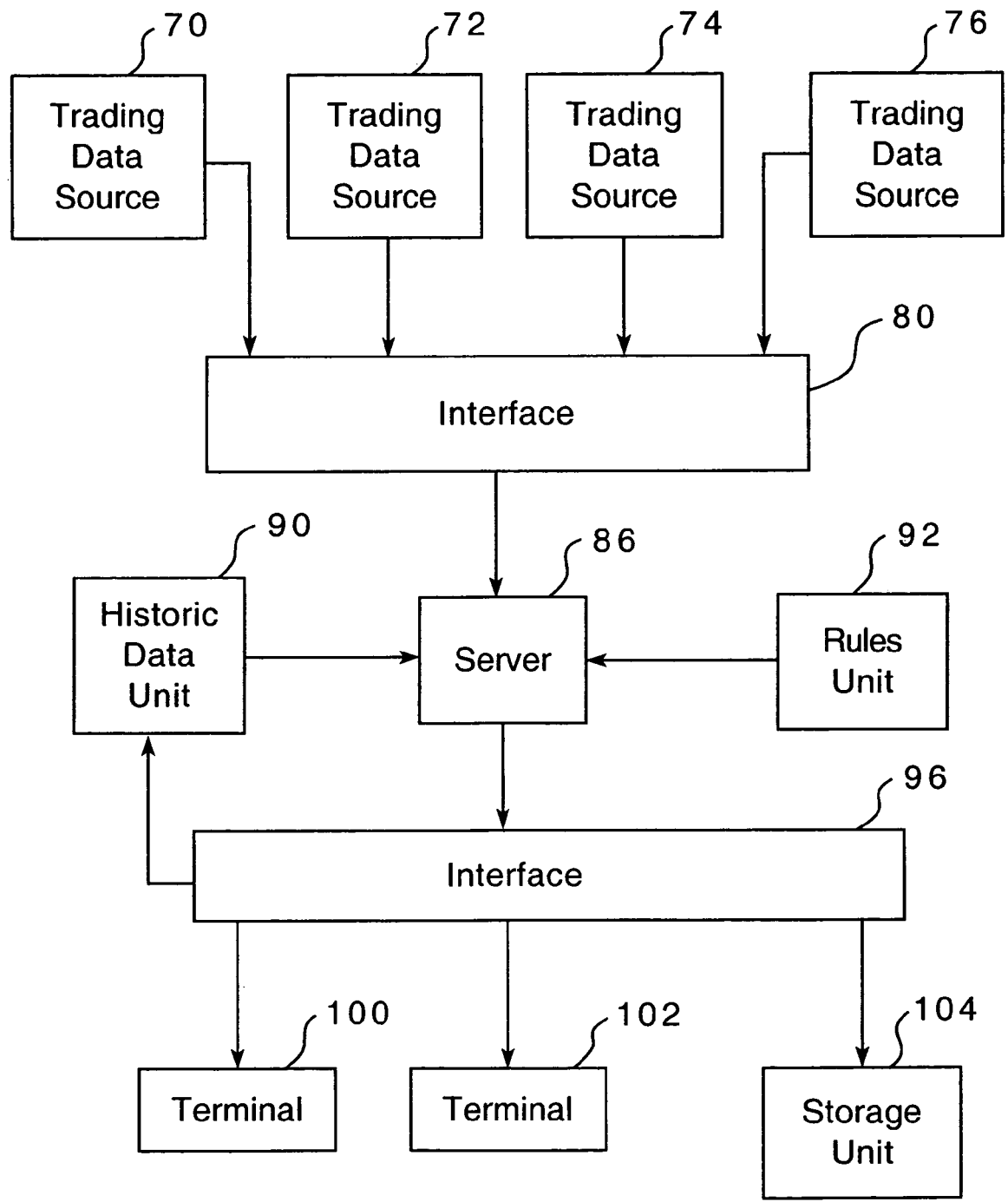
FIG. 2 is a schematic diagram illustrating a form of computerized apparatus of the present invention.

Referring to FIG. 2, there is shown apparatus employable with the present invention. Sources of trading data 70, 72, 74, 76, which are structured to provide trading parameters with respect to a specific trader and specific investment, deliver data to the interface 80 which processes the current trading parameter data for the specific trader and delivers it to the server 86. Server 86 also receives historic trading data from historic data unit 90 and the rules form rules unit 92. The server 86 compares the current trading parameter data with the historic trading data which is then evaluated in respect of the rules with information being emitted through interface 96 to update the historic data unit 90 and to deliver information to the user as by terminals 100, 102 as well as providing a storage unit 104. If desired, storage can be within the server 76.

Also, apart from the reports which may have any desired format and content and which are emitted from the server 86 through interface 96, a user may access the information in a conventional manner.

Various forms of reports may be employed and the information may be provided in such a manner that multiple information units can be provided on a single terminal screen. Also, if desired, hard copy may be obtained by a conventional printer.

The server 86 may be structured to conduct statistical, probabilistic, heuristic, pattern-matching analysis of data in order to detect events of interest in respect of the trading activity of the selected trader with respect to one or more of his or her investments.

The system preferably has within the server 86 the capability of delivering results through at least one of the group consisting of html, xml, xbrl, spreadsheets and comma-separated files.

The invention may be structured to permit or prohibit an end user's viewing in a report or other format underlying detail trades or the omnibus trade.

While a primary focus herein in respect of monitoring for "market timing" has been on mutual fund transactions as this is currently a major problem, the invention is equally applicable with respect to other "investments" as defined herein.

The method and system of the present invention can monitor sub accounts (detail accounts) and omnibus accounts including detection of market timing with respect to each.

It will be appreciated therefore that the present invention provides a method and associated apparatus for the efficient, rapid and accurate processing of current trading parameter or trading data in respect of a specific trader and a specific investment, automated comparison of the same with the corresponding historical trading data followed by an application of rules to the same to determine whether there has been a departure from the rules and responsive action if such is found to exist.

Whereas particular embodiments of the invention have been disclosed herein for purposes of illustration, it will be evident to those skilled in the art that numerous variations of the details may be made without departing from the invention as defined in the appended claims.

The invention claimed is:

1. A computerized system for monitoring investment trading of shares of at least one mutual fund comprising:

at least one computer having a computer tangible readable medium having stored thereon software instructions executable by a processor of the computer, comprising:

code to provide at least one rule of the at least one mutual fund to monitor at least one trading activity of at least one specific trader associated with at least one trading transaction in at least one omnibus account, involving the shares of the at least one mutual fund, to determine at least one trading violation of the at least one rule of the at least one mutual fund, wherein the at least one trading violation is capable of having at least one negative effect on at least one aspect of managing the at least one mutual fund and wherein the at least one specific trader is at least one of:

i) at least one holder of at least one account associated with the at least one trading transaction involving the shares of the at least one mutual fund, ii) at least one broker associated with the at least one trading transaction involving the shares of the at least one mutual fund, iii) at least one account representative associated with the at least one account associated with the at least one trading transaction involving the shares of the at least one mutual fund, or iv) at least one account manager associated with the at least one account associated with the at least one trading transaction involving the shares of the at least one mutual fund;

code to obtain, for the at least one omnibus account, current trading data of the shares of the at least one mutual fund;

code to process, for the at least one omnibus account, the obtained current trading data of the shares of the at least one mutual fund to identify current trading data for the at least one first specific trader, wherein the identified current trading data for the at least one first specific trader comprising at least one first current trading transaction in the at least one omnibus account, wherein the at least one first current trading transaction is associated with the at least one specific trader and involves the shares of the at least one mutual fund;

code to obtain historic trading data for at least one first specific trader, wherein the obtained historic trading data for the at least one first specific trader comprising at least one first past trading transaction which is associated with the at least one first specific trader and involves the shares of the at least one mutual fund;

code to determine, in the at least one omnibus account, at least one first trading violation in at least one trading activity of the at least one first specific trader, wherein the determination is based at least in part on:

comparing at least first portion of the identified current trading data for the at least one first specific trader, at least second portion of the obtained historic trading data for the at least one first specific trader, or any combination thereof, with the at least one rule of the at least one mutual fund to detect, in the at least one omnibus account, at least one event of interest in the at least one trading activity of the at least one first specific trader, wherein the at least one rule of the at least one mutual fund comprises at least one standard defined by the at least one mutual fund, and wherein the at least one of the standard comprises at least one market timing condition that allows to determine, in the at least one omnibus account, based at least in part on the at least one event of interest in the at least one trading activity of the at least one first specific trader, whether the at least one first specific trader has violated at least one market timing rule of the at least one mutual fund, by being associated with (1) at least one purchase transaction, which involves at least one purchase of shares of the at least one mutual fund, and (2) at least one sale transaction, which involves at least one sale of at least a portion of the purchased shares before a period of time specified by the at least one market timing condition has expired; and code to output, for the at least one omnibus account, the determined at least one first trading violation of the at least one rule of the at least one mutual fund by the at least one specific trader.

2. The computerized system of claim 1, further comprising code to compare both the at least first portion of the identified current trading data for the at least one first specific trader and the at least second portion of the obtained historic trading data for the at least one first specific trader with the at least one rule of the at least one mutual fund.

3. The computerized system of claim 1, further comprising code to compare the at least first portion of the identified current trading data for the at least one first specific trader and the at least second portion of the obtained historic trading data for the at least one first specific trader before comparing the at least first portion of the identified current trading data for the at least one first specific trader and the at least second portion of the obtained historic trading data for the at least one first specific trader with the at least one rule of the at least one mutual fund.

4. The computerized system of claim 1, wherein the code to process the obtained current trading data of the shares of the at least one mutual fund further comprising code to process the obtained current trading data of the shares regarding at least one specific mutual fund, and wherein the code to obtain current trading data of the shares of the at least one specific mutual fund further comprising code to receive the obtained current trading data in the form of a plurality of trading parameters specifically related to the at least one first specific trader.

5. The computerized system of claim 4, including the plurality of trading parameters including trade date and time.

6. The computerized system of claim 4, including the plurality of trading parameters including at least one specific account and at least one transaction price.

7. The computerized system of claim 1, including the at least one rule of the at least one mutual fund being structured to at least determine if at least one specific trading pattern has existed.

8. The computerized system of claim 1, wherein the software instructions being structured to assign and track the at least one omnibus account differently from an underlying detail account.

9. The computerized system of claim 1, wherein the at least second portion of the obtained historical trading data for the at least one first specific trader being structured to contain sub account information.

10. The computerized system of claim 1, wherein the at least second portion of the obtained historical trading data for the at least one first specific trader is obtained along with information associated with at least one past omnibus transaction of the at least one omnibus account.

11. The computerized system of claim 1, wherein the software instructions being structured to monitor the at least one trading activity of the at least one first specific trader in at least one sub account of the at least one omnibus account.

12. The computerized system of claim 7, wherein the at least one specific patterns is in respect of higher-or lower-than-expected volumes of trading in the at least one mutual fund by the at least one first specific trader.

13. The computerized system of claim 1, including code to customize the at least one rule of the at least one mutual fund with respect to the at least one first specific trader.

14. The computerized system of claim 4, including code to coordinate a selection of the plurality of trading parameters with the at least one rule of the at least one mutual fund employed.

15. The computerized system of claim 14, including code to modify the at least one rule of the at least one mutual fund to monitor for at least one specific trading conduct.

16. The computerized system of claim 11, including code to detect the at least one trading violation of the at least one market timing rule of the at least one mutual fund in the at least one sub account of the at least one omnibus account.

17. A computerized method for monitoring investment trading of shares of at least one mutual fund comprising:
   providing, by at least one programmed computer, at least one rule of the at least one mutual fund to monitor at least one trading activity of at least one specific trader associated with at least one trading transaction in at least one omnibus account, involving the shares of the at least one mutual fund, to determine at least one trading violation of the at least one rule of the at least one mutual fund, wherein the at least one trading violation is capable of having at least one negative effect on at least one aspect of managing the at least one mutual fund and wherein the at least one specific trader is at least one of:
      i) at least one holder of at least one account associated with the at least one trading transaction involving the shares of the at least one mutual fund,
      ii) at least one broker associated with the at least one trading transaction involving the shares of the at least one mutual fund,
      iii) at least one account representative associated with the at least one account associated with the at least one trading transaction involving the shares of the at least one mutual fund, or
      iv) at least one account manager associated with the at least one account associated with the at least one trading transaction involving the shares of the at least one mutual fund;
   obtaining, by at least one programmed computer, for the at least one omnibus account, current trading data of the shares of the at least one mutual fund;
   processing, by at least one programmed computer, for the at least one omnibus account, the obtained current trading data of the shares of the at least one mutual fund to identify current trading data for at least one first specific trader, wherein the identified current trading data for the at least one first specific trader comprising at least one first current trading transaction in the at least one omnibus account, wherein the at least one first current trading transaction is associated with the at least one specific trader and involves the shares of the at least one mutual fund;
   obtaining, by at least one programmed computer, historic trading data for the at least one first specific trader, wherein the obtained historic trading data for the at least one first specific trader comprising at least one first past trading transaction which is associated with the at least one first specific trader and involves the shares of the at least one mutual fund;
   determining, by at least one programmed computer, in the at least one omnibus account, at least one first trading violation in at least one trading activity of the at least one first specific trader, wherein the determination is based at least in part on:
      comparing at least first portion of the identified current trading data for the at least one first specific trader, at least second portion of the obtained historic trading data for the at least one first specific trader, or any combination thereof, with the at least one rule of the at least one mutual fund to detect, in the at least one omnibus account, at least one event of interest in the at least one trading activity of the at least one first specific trader, wherein the at least one rule of the at least one mutual fund comprises at least one standard defined by the at least one mutual fund, and wherein the at least one of the standard comprises at least one market timing condition that allows to determine, in the at least one omnibus account, based at least in part on the at least one event of interest in the at least one trading activity of the at least one first specific trader, whether the at least one first specific trader has violated at least one market timing rule of the at least one mutual fund, by being associated with (1) at least one purchase transaction, which involves at least one purchase of shares of the at least one mutual fund, and (2) at least one sale transaction, which involves at least one sale of at least a portion of the purchased shares before a period of time specified by the at least one market timing condition has expired; and
   outputting, by at least one programmed computer, for the at least one omnibus account, the determined at least one first trading violation of the at least one rule of the at least one mutual fund by the at least one specific trader.

18. The computerized method of claim 17, further comprising comparing, by at least one programmed computer, both the at least first portion of the identified current trading data for the at least one first specific trader and the at least second portion of the obtained historic trading data for the at least one first specific trader with the at least one rule of the at least one mutual fund.

19. The computerized method of claim 17, further comprising comparing, by at least one programmed computer, the at least first portion of the identified current trading data for the at least one first specific trader and the at least second portion of the obtained historic trading data for the at least one first specific before comparing the at least first portion of the identified current trading data for the at least one first specific trader and the at least second portion of the obtained historic trading data for the at least one first specific trader with the at least one rule of the at least one mutual fund.

20. The computerized method of claim 17, wherein the processing the obtained current trading data of the shares of the at least one mutual fund further comprising processing, by at least one programmed computer, the obtained current trading data of the shares regarding at least one specific mutual fund, and wherein the obtaining current trading data of the shares of the at least one specific mutual fund further comprising receiving, by at least one programmed computer, the obtained current trading data in the form of a plurality of trading parameters specifically related to the at least one first specific trader.

21. The computerized method of claim 20, including the plurality of trading parameters including trade date and time.

22. The computerized method of claim 20, including the plurality of trading parameters including at least one specific account and at least one transaction price.

23. The computerized system of claim 17, including the at least one rule of the at least one mutual fund being structured to at least determine if at least one specific trading pattern has existed.

24. The computerized method of claim 17, wherein the steps of the method being structured to assign and track the at least one omnibus account differently from an underlying detail account.

25. The computerized method of claim 17, wherein the at least a second portion of the obtained historical trading data for the at least one first specific trader being structured to contain sub account information.

26. The computerized method of claim 17, wherein the at least second portion of the obtained historical trading data for the at least one first specific trader is obtained along with information associated with at least one past omnibus transaction of the at least one omnibus account.

27. The computerized method of claim 17, wherein the steps of the method being structured to monitor the at least one trading activity of the at least one first specific trader in at least one sub account of the at least one omnibus account.

28. The computerized method of claim 23, wherein the at least one specific pattern is in respect of higher- or lower-than-expected volumes of trading in the at least one mutual fund by the at least one first specific trader.

29. The computerized method of claim 17, including customizing the at least one rule of the at least one mutual fund with respect to the at least one first specific trader.

30. The computerized method of claim 20, including coordinating a selection of the plurality of trading parameters with the at least one rule of the at least one mutual fund employed.

31. The computerized method of claim 30, including modifying the at least one rule of the at least one mutual fund to monitor for at least one specific trading conduct.

32. The computerized method of claim 27, including employing the steps of the method to detect the at least one trading violation of the at least one market timing rule of the at least one mutual fund in the at least one sub account of the at least one omnibus account.

* * * * *